United States Patent [19]
Rupprecht

[11] Patent Number: 5,234,316
[45] Date of Patent: Aug. 10, 1993

[54] FILTERING DEVICE FOR A CANNED MOTOR

[75] Inventor: Peter Rupprecht, Bayreuth, Fed. Rep. of Germany

[73] Assignee: KSB Aktiengesellschaft, Frankenthal, Fed. Rep. of Germany

[21] Appl. No.: 671,738
[22] PCT Filed: Oct. 10, 1989
[86] PCT No.: PCT/EP89/01194
§ 371 Date: May 7, 1991
§ 102(e) Date: May 7, 1991
[87] PCT Pub. No.: WO90/04110
PCT Pub. Date: Apr. 19, 1990

[30] Foreign Application Priority Data

Oct. 12, 1988 [DE] Fed. Rep. of Germany ....... 3834667

[51] Int. Cl.⁵ .................................................. F04D 29/70
[52] U.S. Cl. ...................... 415/121.2; 415/110; 241/97
[58] Field of Search ............... 415/121.1, 121.2, 110, 415/111, 112, 170.1; 241/46.06, 97

[56] References Cited

U.S. PATENT DOCUMENTS

| | | | |
|---|---|---|---|
| 2,644,403 | 7/1953 | Dawson | 415/121.1 |
| 3,671,137 | 6/1972 | Ball | 415/111 |
| 4,230,324 | 10/1980 | Derman | 415/110 |
| 4,511,307 | 4/1985 | Drake | 415/170.1 |
| 4,534,388 | 8/1985 | Pall et al. | 241/46.06 |
| 4,684,318 | 8/1987 | Mulders | 415/110 |
| 4,812,108 | 3/1989 | Kotera | 415/111 |

FOREIGN PATENT DOCUMENTS

| | | | |
|---|---|---|---|
| 599355 | 6/1960 | Canada | 415/121.1 |
| 149716 | 8/1985 | Denmark | |
| 2100345 | 8/1972 | Fed. Rep. of Germany | |
| 3513832 | 10/1986 | Fed. Rep. of Germany | |
| 56203 | 11/1943 | Netherlands | 241/46.06 |
| 1237633 | 6/1971 | United Kingdom | |

Primary Examiner—John T. Kwon
Attorney, Agent, or Firm—Peter K. Kontler

[57] ABSTRACT

A canned motor has a housing and a motor shaft which extends through the housing. A rotor is fixed to the shaft and is located in a rotor compartment within the housing. The rotor compartment has a flow path for circulation of a cooling and lubricating fluid through the compartment. A sleeve surrounds the shaft upstream of the flow path and is surrounded by a second sleeve. The two sleeves cooperate to define a gap which serves as a filter for fluid entering the rotor compartment. The minimum height of the gap is smaller than the minimum height of the flow path to prevent suspended solid particles which can obstruct the flow path from entering the latter. The sleeves are composed of a hard material so that oversized particles can be ground down by causing the fluid to repeatedly bring the particles into contact with the sleeves.

10 Claims, 2 Drawing Sheets

FILTERING DEVICE FOR A CANNED MOTOR

BACKGROUND OF THE INVENTION

The invention relates to a filtering device for a canned motor.

Various designs and various filter inserts for such filtering devices are known - e.g., from the British patent application 1 237 633. They are used mainly in canned motor pumps which function to convey contaminated fluids. The known filtering devices are mostly situated in the wall between the pressure chamber of the centrifugal pump and the rotor chamber of the canned motor. The filter insert, which consists of a porous material, a strainer or the like, tends to become clogged after a period of time which depends upon the type and quantity of the solid inclusions. This leads to interruption of the rinsing stream conducted through the rotor chamber so that the heat generated in the canned motor due to power losses is no longer adequately removed. As a result of this circumstance, continuous monitoring and frequent maintenance (replacement or cleaning of the filter insert) are necessary.

SUMMARY OF THE INVENTION

It is an object of the invention to provide a filtering device for canned motors which, on the one hand, traps solid particles having a size such that the downstream gap is endangered and, on the other hand, is not imperiled by obstruction or clogging.

According to the invention, the object set forth is achieved in that a filtering gap bounded by sleeves of hard material is established between the housing and the rotor shaft and has a minimum width smaller than the minimum width of the downstream gap situated in the path of the rinsing stream inside the rotor chamber.

The principle of the invention is to allow small (harmless) particles to pass but to hold back larger inclusions until they have been ground to a safe size by the walls of the sleeves which define the filtering gap.

In accordance with the invention, the filtering gap can be constructed so as to enhance the grinding action of the filtering gap and increase the life of the sleeves forming the filtering gap.

BRIEF DESCRIPTION OF THE DRAWINGS

The invention will be described in greater detail with reference the drawings in which.

DESCRIPTION OF THE PREFERRED EMBODIMENTS

Figure 1:
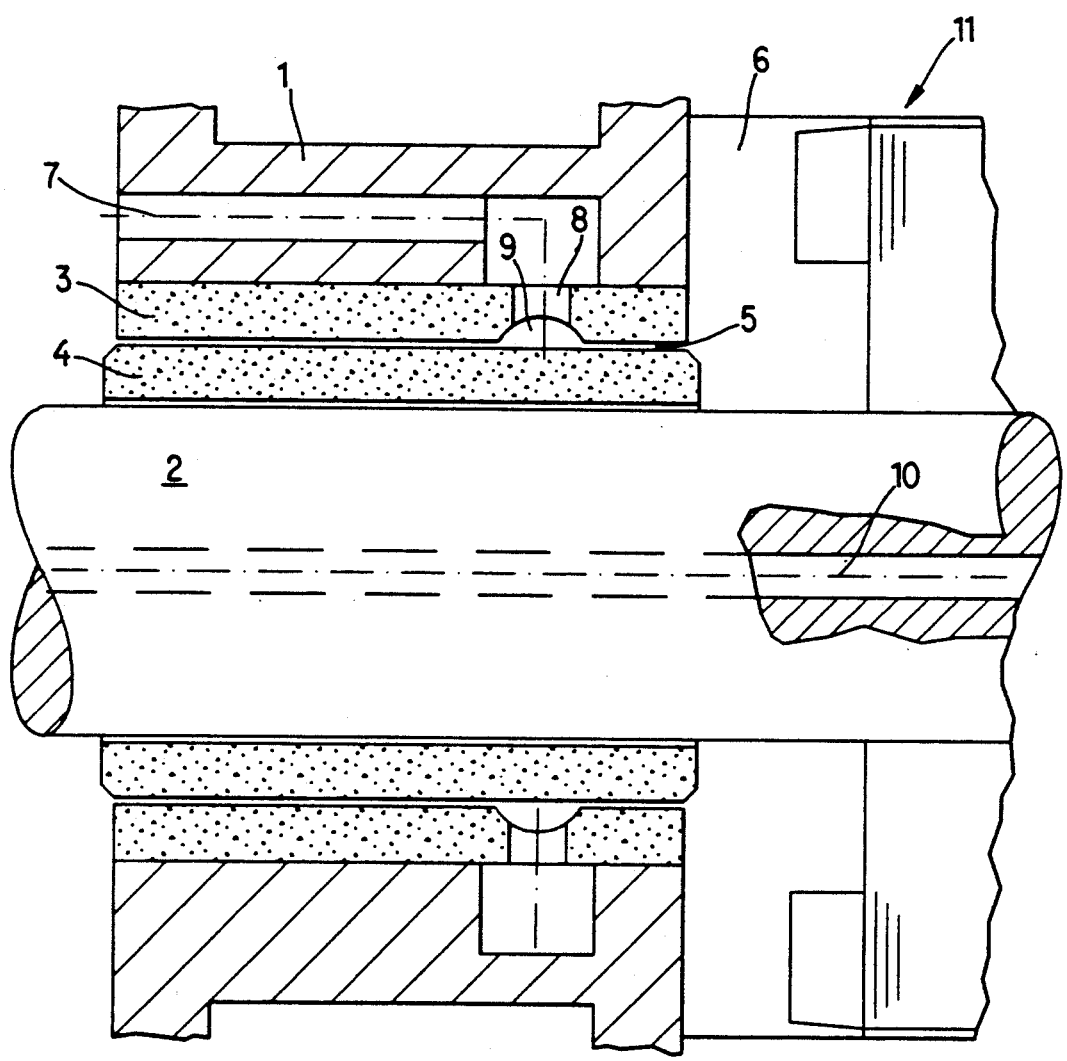
FIG. 1 is a section through a canned motor in the area of the filtering device.

Referring to FIG. 1, a canned motor 11 has a rotor shaft 2 which is disposed in a housing 1. A ceramic sleeve 3 is inserted in the housing 1 and surrounds a sleeve 4 which has been pushed onto the rotor shaft 2 and likewise consists of ceramic. The confronting walls of the sleeves 3, 4 bound a filtering gap 5 located upstream of the rotor chamber 6 of the canned motor.

Figure 2:
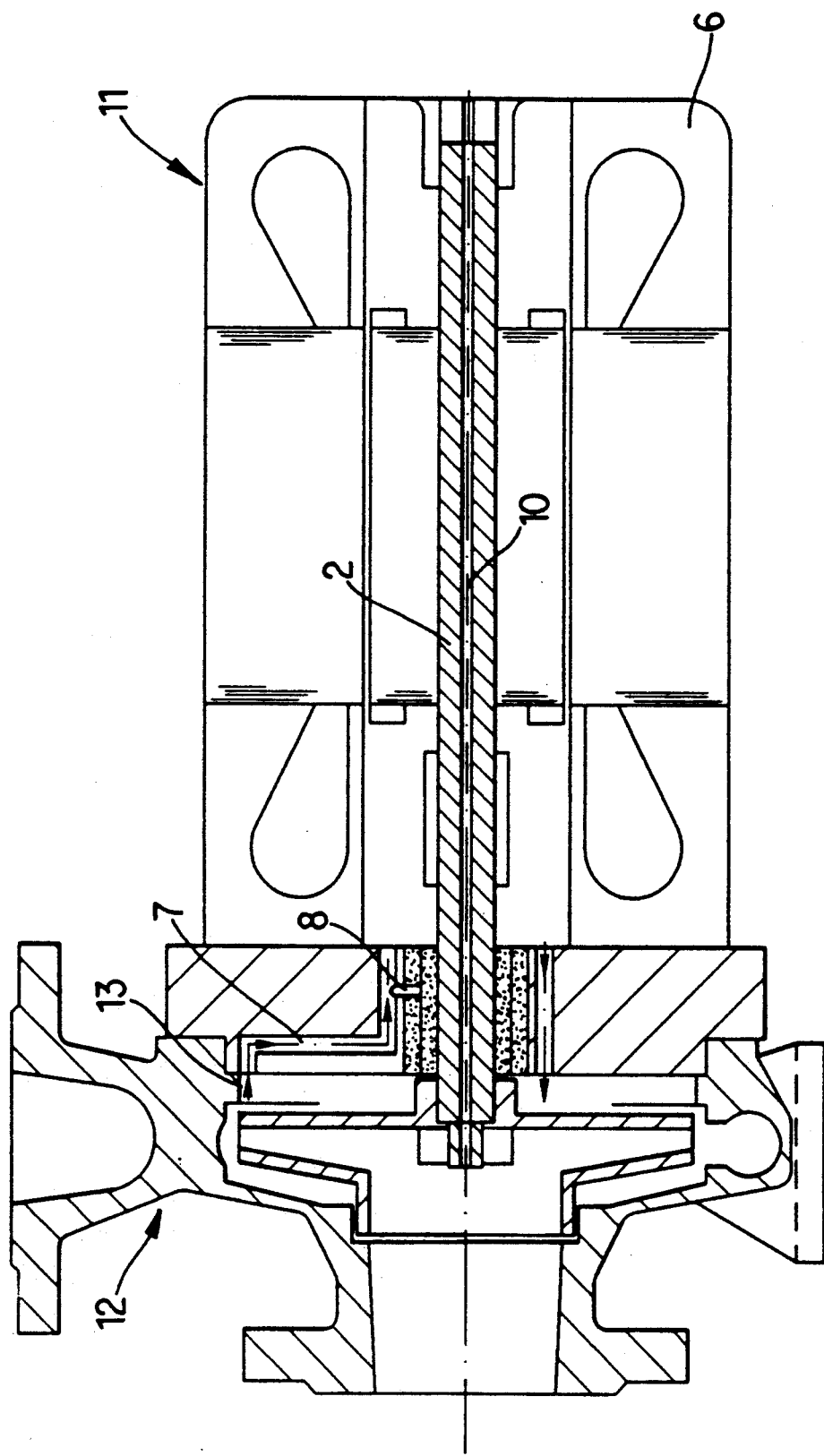
FIG. 2 is a section showing the motor of FIG. 1 coupled to a centrifugal pump.

As shown in FIG. 2, a channel 7 in the housing 1 serves for the introduction of rinsing fluid from the pressure chamber 13 of a centrifugal pump 12. The channel 7 has an axially extending portion opening into a plurality of bores 8 which extend radially in the sleeve 3 and are distributed over the periphery thereof. The bores 8, in turn, open into an annular compartment 9 likewise defined by the sleeve 3. The annular compartment 9 narrows in the direction of the filtering gap 5 situated before the rotor chamber 6.

A passage 10 extending axially through the shaft 2 is provided for discharge of the rinsing fluid from the rotor chamber 6 as best seen in FIG. 2. The rinsing fluid arriving at the annular compartment 9 via the channel 7 and the bores 8 contains solid particles having a size greater than the width of the filtering gap 5. These particles are initially retained in the ring of fluid circulating upstream of the filtering gap 5. The current directed towards the rotor chamber again and again entrains a portion of the solid particles and conveys them to the inlet of the filtering gap 5. The particles are there gradually ground until they finally enter the filtering gap 5. Since they are here also subjected to a grinding action, their size at the end of the filtering gap is such that the following gap is no longer endangered. They are now carried along by the rinsing fluid, conducted through the rotor chamber 6 and withdrawn via the passage 10.

I claim:

1. A canned motor, comprising a housing defining a rotor compartment and a first gap for the flow of a fluid through said compartment, said first gap having a first width; a rotor shaft extending through and defining with said housing a chamber upstream of said first gap; and filtering means provided in said chamber and including a rotary first tubular element which surround said shaft and a stationary second tubular element which surrounds said first tubular element, said tubular elements together defining a second gap having a second width less than said first width, said tubular elements together constituting a grinding means for suspended solids entering said second gap so that solids too large to pass through said second gap are ground prior to entering said first gap.

2. The motor of claim 1, wherein each of said tubular elements comprises a hard material.

3. The motor of claim 2, wherein at least one of said tubular elements comprises a ceramic.

4. The motor of claim 1, wherein said tubular elements have respective surface portions which face one another, at least one of said surface portions being rough.

5. The motor of claim 1, wherein said second gap is arranged so that fluid flows towards said second gap in the axial direction of said shaft.

6. The motor of claim 1, wherein said second gap narrows in a direction towards said compartment.

7. The motor of claim 1, wherein said second gap has an inlet and said tubular elements together define an annular compartment in the region of said inlet.

8. The motor of claim 7, wherein said second gap is annular and has an outer diameter, said annular compartment having a diameter greater than said outer diameter.

9. A canned motor, comprising a housing defining a rotor compartment and a first gap for circulation of a fluid through said compartment, said first gap having a first width; a rotor shaft extending through and defining with said housing a chamber upstream of said first gap; and filtering means in said chamber, said filtering means including a rotary first tubular element which surrounds said shaft and a stationary second tubular element which surrounds said first tubular element, said tubular elements together defining a second gap having a second width less than said first width, said second gap being arranged so that fluid flows toward said second gap transversely of said shaft.

10. The motor of claim 9, wherein said second gap has an inlet and said second tubular element is provided with at least one radial opening in the region of said inlet.

* * * * *